United States Patent [19]

Oestreich et al.

[11] Patent Number: 5,283,014
[45] Date of Patent: Feb. 1, 1994

[54] METHOD AND APPARATUS FOR MANUFACTURING AN OPTICAL CABLE

[75] Inventors: Ulrich Oestreich, Munich; Reiner Schneider, Ebersdorf B.CBG, both of Fed. Rep. of Germany

[73] Assignee: Siemens Aktiengesellschaft, Munich, Fed. Rep. of Germany

[21] Appl. No.: 874,380

[22] Filed: Apr. 27, 1992

[30] Foreign Application Priority Data

Jun. 21, 1991 [DE] Fed. Rep. of Germany ....... 4120571

[51] Int. Cl.$^5$ ............................................... G02B 6/44
[52] U.S. Cl. ......................... 264/1.5; 156/172; 156/500; 264/1.6; 264/174; 385/113
[58] Field of Search ............... 264/1.5, 1.6, 174; 156/172, 180, 244.12, 244.23, 500; 350/96.23; 385/113; 425/114

[56] References Cited

U.S. PATENT DOCUMENTS

| | | |
|---|---|---|
| 4,141,623 | 2/1979 | Dubost et al. |
| 4,414,165 | 11/1983 | Oestreich et al. |
| 4,457,583 | 7/1984 | Mayr et al. .......................... 264/1.5 |
| 4,474,638 | 10/1984 | Einsle .................................. 264/1.5 |
| 4,615,168 | 10/1986 | Oestreich ............................. 156/172 |
| 4,726,750 | 2/1988 | Einsle et al. ........................ 264/1.5 |
| 4,814,116 | 3/1989 | Oestreich et al. ................... 264/1.5 |
| 4,857,242 | 8/1989 | Hoffmann et al. ................... 264/1.5 |
| 4,861,525 | 8/1989 | Oestreich ............................. 264/1.5 |
| 4,985,185 | 1/1991 | Mayr et al. .......................... 264/1.5 |
| 4,997,258 | 3/1991 | Oestreich ............................. 264/1.5 |

FOREIGN PATENT DOCUMENTS

| | | | |
|---|---|---|---|
| 2393503 | 2/1979 | France | 264/1.5 |
| 2509275 | 1/1983 | France . | |
| 2517074 | 5/1983 | France . | |
| 49-32108 | 8/1974 | Japan | 264/174 |
| 58-190842 | 11/1983 | Japan | 264/1.5 |
| 3-95505 | 4/1991 | Japan | 264/1.5 |
| 1457868 | 12/1976 | United Kingdom . | |
| 2722147 | 12/1977 | United Kingdom . | |
| 2167002 | 5/1986 | United Kingdom . | |
| 3111963 | 7/1986 | United Kingdom . | |
| 3502768 | 7/1986 | United Kingdom . | |
| 2523738 | 12/1986 | United Kingdom . | |
| 2193144A | 2/1988 | United Kingdom | 264/174 |
| 2197497 | 5/1988 | United Kingdom . | |

*Primary Examiner*—Jeffery Thurlow
*Attorney, Agent, or Firm*—Hill, Steadman & Simpson

[57] ABSTRACT

A method and apparatus for forming an optical cable includes an extruder for extruding a sheath on each light waveguide to form an independent light waveguide lead, a cooling device immediately following the extruder for cooling the light waveguide lead, which is then stranded to form a lead bundle.

31 Claims, 4 Drawing Sheets

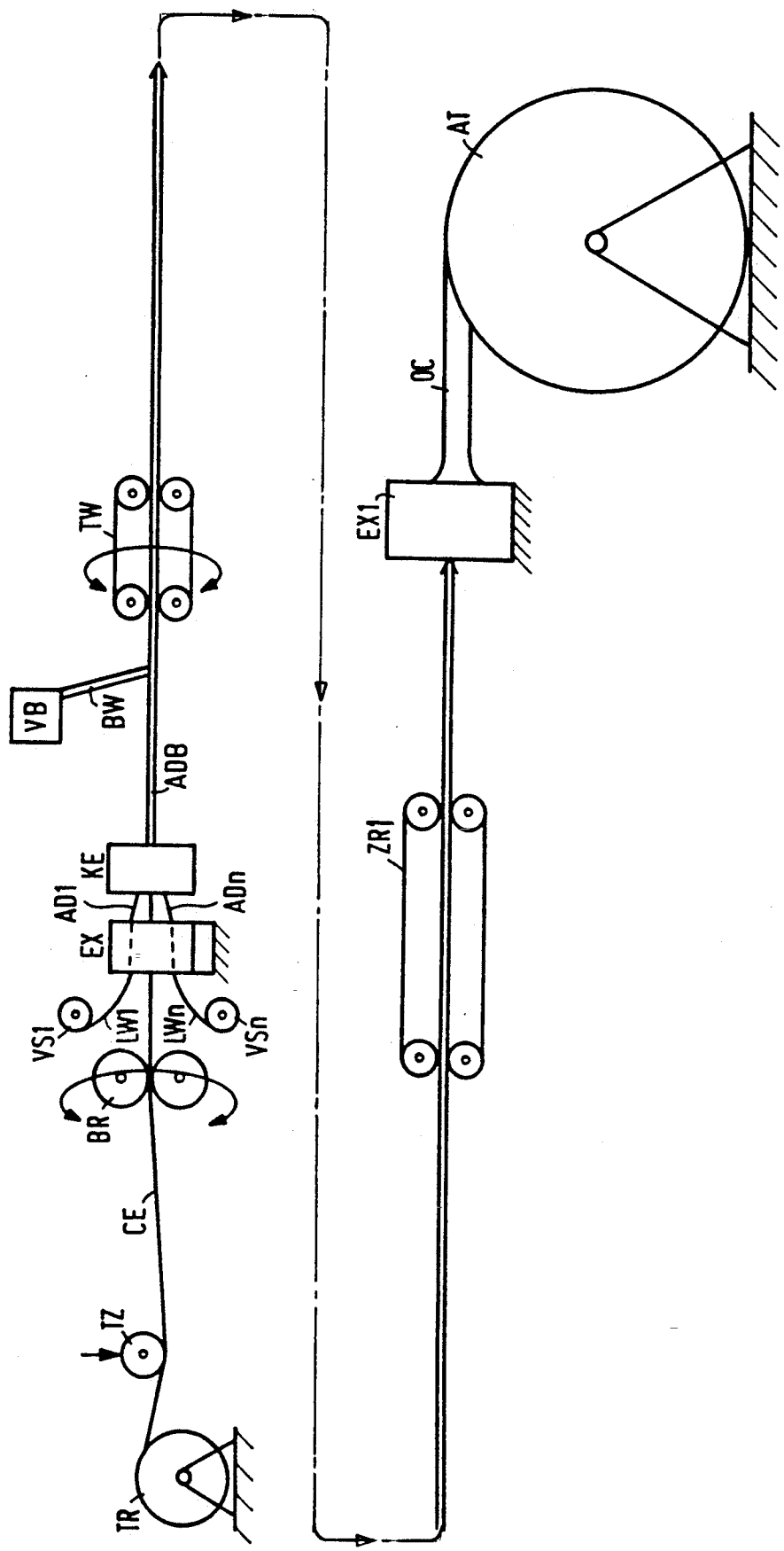

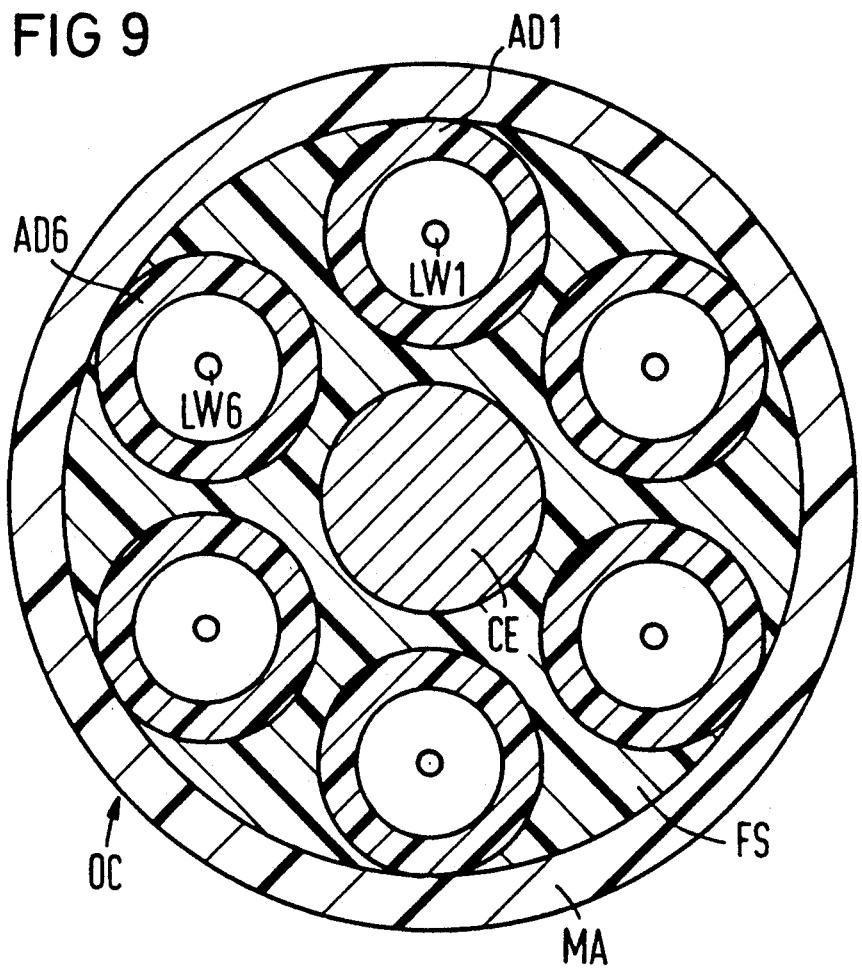

METHOD AND APPARATUS FOR MANUFACTURING AN OPTICAL CABLE

BACKGROUND OF THE INVENTION

The present invention is directed to a method and apparatus for manufacturing optical cables containing at least two light waveguides, which method and apparatus utilizes an extruder to which the light waveguides are supplied, and which serves the purpose of producing a protective sheath for the waveguide.

U.S. Pat. No. 4,414,165, whose disclosure is incorporated herein by reference thereto, and German Letters Patent 31 11 963, each disclose a method and apparatus for forming an optical transmission element having a fiber received in a tubular jacket containing filling material. Preferably, the jacket is formed by two concentric envelopes. As disclosed, one always proceeds so that the light waveguide is first manufactured and then is stored as an intermediate product, for example on a plate or a drum. The cable core is then composed of a plurality of these intermediate products on the basis of a separate stranding process that occurs at a different location and at a different time. The stranding itself can occur in a long lay or with changing stranding directions to form an SZ-stranding. Winding the intermediate product onto a drum or depositing the intermediate product represents an additional work outlay or cost and also requires storage in respective deposit areas.

German Patent 25 23 738 discloses a cable wherein the light waveguides are accommodated in interspaces or chambers of a core element that has the approximate cross sectional shape of a wheel having spokes. A tensile central element is provided in the middle and the overall structure is manufactured in one working cycle as a closed single-piece element. The disadvantage of such a structure is that the fiber of fiber bundles are placed into a closed structure and no protection is provided for these bundles or fibers, such as sleeves, without additional cost.

SUMMARY OF THE INVENTION

An object of the present invention is to provide an improved method for an optical cable, wherein a continuous, rational and versatily employed manufacturing process occurs for an advantageous construction of the optical cable.

According to the invention, this object is achieved in a method of forming a cable by the steps of supplying light waveguides to an extruder in separate paths which are eccentric to the core, at least two envelopes, each respectively embracing at least one light waveguide and forming an independent light waveguide lead, are produced by the extruder and the light waveguide leads are then cooled and then subjected to a stranding process for forming a cable bundle immediately thereafter or during cooling.

The invention also avoids intermediate products, because the light waveguide leads that are produced by the extruder are immediately cooled after they are manufactured and they are then subjected to a stranding process directly following the cooling. The intermediate storing and warehousing of the light waveguide leads on, for example, drums or deposit plates is, thus, eliminated. Compared to the structure having its chambered cable core element comprising closed longitudinal channels, the advantage occurs that only simple light waveguide leads need be, respectively, manufactured, for example discrete elements that are to be stranded in a known way. A further advantage is that even inexpensive envelope materials that are incapable of being intermediately stored can be employed for the light waveguide leads, since they are mechanically fixed in the cable core immediately after the extrusion and cooling.

The invention is also directed to an apparatus for the implementation of the method of the invention. This apparatus is characterized in that the supply drum for the central element and the take-up drum for the finished cable are arranged fixed in space and in that a brake rotating around the longitudinal axis of the central element is provided preceding the extruder. This brake impresses a torsion on the central element in that a twister seizes the light waveguide bundles formed of the light waveguide leads provided following the extruder. This twister, likewise, rotates around the longitudinal axis of the central element and in that the drive for the rotational motion of both the brake, as well as the twister, occur so that the two rotate synchronously and in the same direction.

Other advantages and features of the invention will be readily apparent from the following description of the preferred embodiments, the drawings and claims.

BRIEF DESCRIPTION OF THE DRAWINGS

FIG. 8 is a further side view of an apparatus for implementing the method of the present invention; and FIG. 9 is a transverse cross sectional view of a cable having a core with a filled material in accordance with the present invention.

DESCRIPTION OF THE PREFERRED EMBODIMENTS

Figure 1:
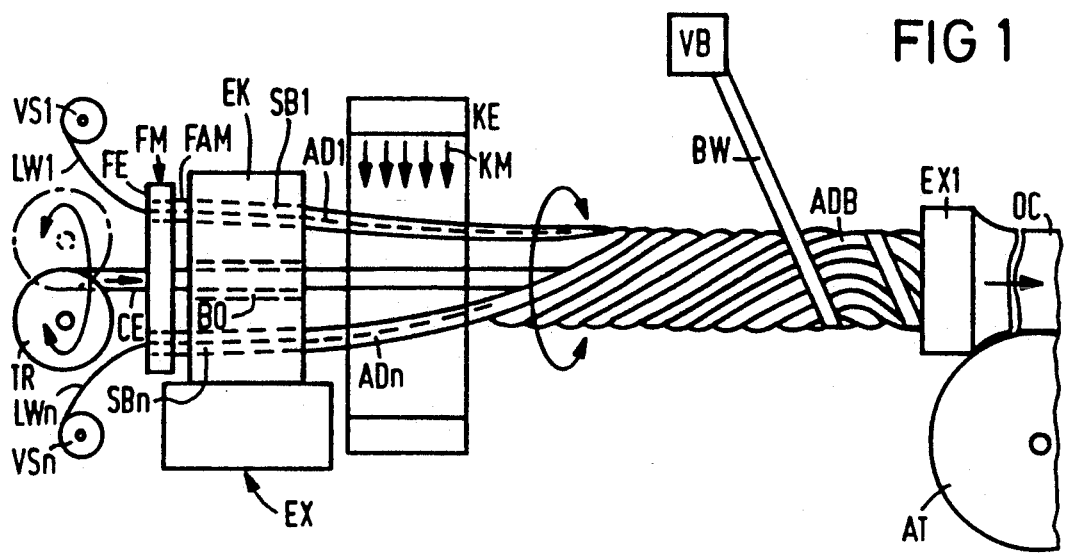
FIG. 1 is a side view of an apparatus for implementing the inventive method.

The principles of the present invention are particularly useful when incorporated into an apparatus illustrated in FIG. 1. In this apparatus, a supply drum TR for a central tensile element CE, which is composed of, for example, steel reinforced plastic or a fiberglass reinforced plastic, has the element CE continuously hauled off from left to right, whereby a rotation around a longitudinal axis of the central element is also carried out by the orbiting of the drum TR around the longitudinal axis.

Figure 2:
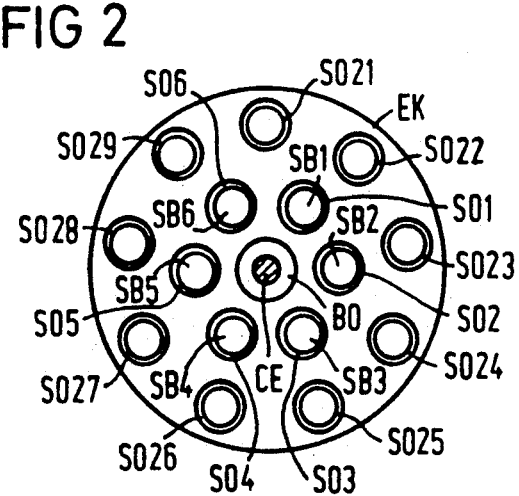
FIG. 2 is an end view of an extruder head for employment in the inventive method.

When an SZ-stranding is desired, changing rotational sense or direction is employed. An extruder EX is provided, whose extruder head EK has a central bore BO (see FIG. 2) through which the element CE is conducted. It is also possible to apply a filling compound FM onto the central element CE by a filling means FE before the central element CE enters into the bore BO, which is designed to be appropriately large enough to carry the element with the filling material. The extruder head EK of the extruder EX comprises a number of annular extrusion openings or exit nozzles proceeding concentrically relative to the bore BO that are referenced SO1-SO6 in the present illustration. It is assumed in the present example that only a single lead layer or ply is to be produced with the extruder head EK. However, it is also possible to manufacture a multi-layer or multi-ply arrangement in one working cycle, for example if a further layer of circularly arranged discharge nozzles SO21-SO29 are provided further toward the outside so that a two-layer, coated cable core is capable of being, thus, manufactured in a single working cycle. It is also possible to provide a further extruder offset, as seen in the running direction, from the extruder EX, for example at the location where the extruder EX1 is shown in FIG. 1, and to provide an extruder head thereof with the nozzles SO21-SO29. A center bore of this extruder head, of course, must be selected to be of such a size that the lead bundle ADB can be conducted therethrough.

As shown in broken lines in FIG. 1 for the bore SB1, the guide bores for the light waveguides extend through the entire extruder head EK and, thus, enable the entry of at least, respectively, one light waveguide, for example LW1, that is hauled-off from a corresponding supply reel VS1. Of course, it is also possible to draw a plurality of light waveguides or light waveguide ribbons, as well, into a corresponding nozzle. Given a total of n light waveguide leads to be manufactured for configuring a layer of cable core, VS1-VSn light waveguide supply reels are to be provided in accordance with the schematic illustration of FIG. 1.

Figure 3:
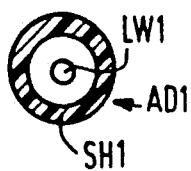
FIG. 3 is a transverse cross sectional view of the structure of a single light waveguide lead that is manufactured with the extruder head of FIG. 2.

A hose-shaped protective sheath SH1 (see FIG. 3) is produced by the extruder head EK in the region of the discharged nozzles SO1-SO6. These protective sheaths contain at least one light waveguide LW1 on their inside so that the overall arrangement forms a light waveguide lead AD1. It is also possible to fill the inside of the light waveguide lead AD1 with a corresponding, soft, for example thixotropic, filling compound. An appropriate filling means FE, which receives a filling compound FM, is provided for this purpose at the input of the extruder head EK for each of the leads AD1-ADn to be manufactured. The applied filling compound FM can be brought to the desired diameter with a stripper means FAM.

The protective sheaths, for example SH1, for the light waveguide leads, such as AD1, are manufactured in a profile stretching process, whereby a cooling means KE is provided immediately following the extruder head EK. The light waveguide leads AD1-ADn that still proceed at a corresponding distance from one another are, thus, flooded in a radial direction by a coolant KM at this cooling means. This cooling means KM can be cold air or, for example, cold water, as well. After adequate cooling and solidification, the light waveguide leads AD1-ADn are brought increasingly closer together, namely to such an extent that they lie on the outside surface of the central element CE. For the purpose of simplifying the illustration, the layers AD1-ADn are shown at a greater distance from the central element CE in the drawings, while in reality they lie on the central element CE at least in the region of the right-hand end of FIG. 1. Since the haul-off drum TR for the central element CE rotates around the longitudinal axis of the central element CE that runs through on a straight line with the rotation being in a pendular direction given an SZ-stranding, the surface of the central element CE entrains the individual light waveguide leads AD1-ADn on the basis of a frictional lock and effects a stranding as shown in the right-hand part of FIG. 1. A continuation of the cooling can occur during this spanning. It is also possible to work with stationary haul-offs and take-up drums, as shown with reference to FIGS. 6, 7 and 8.

Figure 4:
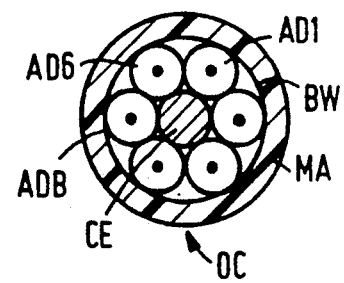
FIG. 4 is a transverse cross sectional view through a structure of a cable core having a single ply of light waveguide leads as produced by the method and apparatus of the present invention.

The lead bundle ADB obtained in this way represents one layer of a cable core, together with the central element CE, and, for example, exhibits the cross sectional shape schematically shown in FIG. 4. Unravelling of the leads AD1-AD6 applied SZ-shaped stranding is provided by a winding BW, which is taken from a supply reel VB in FIG. 1.

The lead bundle ADB obtained in this manner may be supplied to an additional or second extruder EX1 that applies a cable cladding MA (see FIG. 4) that produces a finished optical cable OC. Proceeding from the light waveguides LW1-LWn or, respectively, from the light waveguide ribbons, the invention, thus, allows a finished cable OC to be manufactured in a single continuous process. Work can, thereby, be carried out with a high manufacturing speed and a storage and warehousing of intermediate products is not required. The optical cable OC is wound onto a take-up drum AT that, likewise, rotates. The cladding extruder EX1 is kept out of the stranding motion and is traversed without rotation.

Figure 5:
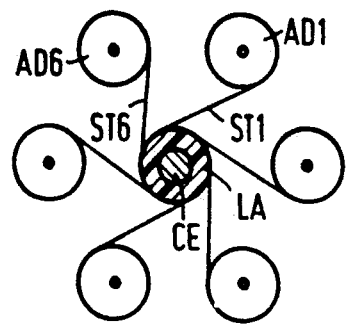
FIG. 5 is a transverse cross sectional view through an arrangement wherein light waveguide leads are joined to the central element via a web.

The static friction between the individual leads AD1-ADn and the central element CE essentially see to the stranding process of the apparatus according to FIG. 1. If this proves inadequate, one could then proceed so that, for example as shown in FIG. 5, a coat LA is co-applied onto the central element CE by the injection molding head EK or by a filling means FE. Narrow, thin connecting webs ST1-ST6 via which the leads AD1-AD6 are forceably entrained given a rotation around the longitudinal axis of the central element CE and are placed against the surface of the central element CE, could be co-extruded between this coating LA and the protective sheath of the individual light waveguides AD1-AD6. Since the leads are still soft at the extruder head and only solidify after they are completely cooled, there is no entrainment problems.

As a result of the curvature radius of the leads AD2-ADn already stranded when they are produced, $\rho = R/\cos 2\alpha$, wherein R equals the stranding radius and $\rho$ equals the angle of twist. Due to the curvature angle $\beta$, approximately $n \cdot S/\rho$, wherein n is the number of lays between two reversing points and S equals the length of lay occurring given an SZ-stranding, a systematic underlength in the order of 0.5%, in fact, occurs on the one hand. On the other hand, an adequate coupling angle for the following compensation is established as a consequence of the cooling and shrinkage. The "excess length" of the fibers to be produced in the process and which, of course, is only intended to compensate somewhat for the occurring loss in length, can also be produced in a known way on the basis of elastic prestretching and subsequent elastic contraction of the central element CE and/or by limited undoing of the stranded condition after the feed of the fibers or, respectively, these procedures can contribute thereto.

A stranded union can be produced spin-wrapped and clad in this way in one working cycle without having to employ expensive and interactable materials for the lead envelopes. A subsequent change in length of the lead coupled to the central element is not possible. The mechanical property of the lead can be limited to what is absolutely necessary in view of the cladding following immediately thereafter.

Since extrusion tools, for example extrusion heads, can be easily interchanged, an economical fabrication for bundled lead cables of, for example, up to at least 100 fibers becomes possible here without having to take the problem of fiber division at the end into consideration, which always arises in the case of a chambered cable. The problem of chamber calibration that always arises given a chamber cable, likewise, is eliminated and less expensive materials can be utilized, for example polyolefines instead of hard, expensive materials.

Figure 6:
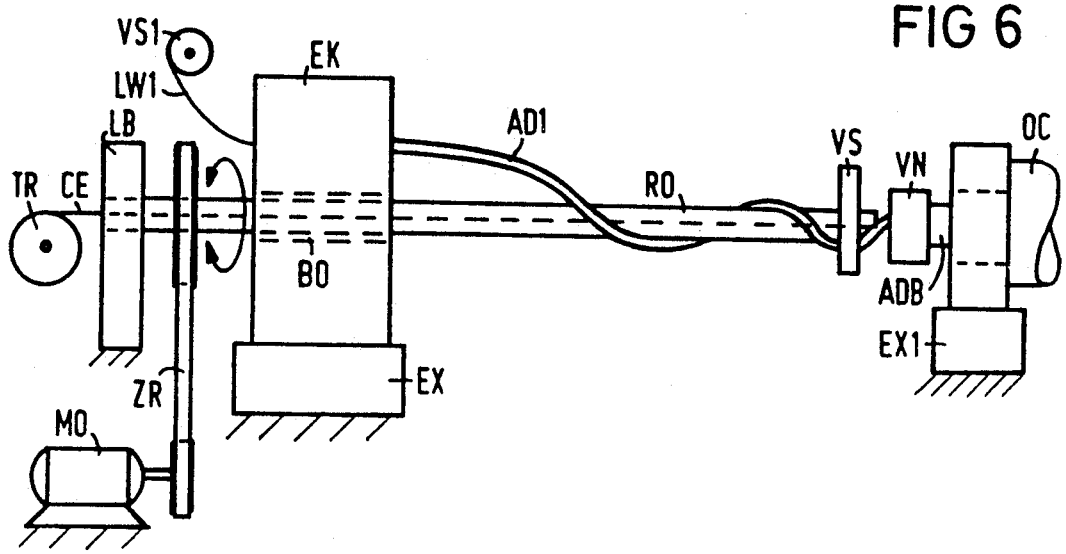
FIG. 6 is a side view of a modified apparatus for the implementation of the method of the present invention.

If the stranding process cannot be implemented or cannot be implemented only with the central element, for example because of inadequate diameter thereof, an apparatus according to FIG. 6 can be utilized. The structure of the extruder head EK corresponds to that of FIG. 1, whereby only a single lead AD1 is shown here for the purpose of simplifying the illustration. By contrast thereto, what is referred to as a "tube store" is employed for the stranding process, to which end a tube RO is clamped at one side or end is provided and is held in a bearing block LB. This tube RO extends through the bore BO of the extruder head EK and extends beyond the extruder head toward the right by a certain length. In any case, it must be carried to such a length that the leads AD1-ADn lie adequately firmly on the tube store RO and are entrained by a frictional lock. A motor MO having a toothed belt ZR is provided for rotating the tube store RO. The tube store RO is expediently operated with changing lay directions and its surface roughness, together with that of the length of the seat of the respective leads AD1-ADn, define the intensity of the stranding process. For improving the stranding, a stranding disk VS is rigidly joined to the tube at one end of the tube store RO. This stranding disk VS comprises a series of ports, through whose openings the leads AD1-ADn are conducted. A stranding nipple VN is provided following thereafter in a known manner. A completely stranded bundle similar to ADB is, thus, present at the right-hand end of the stranding apparatus of FIG. 6. This bundle ADB is provided with a cladding from an extruder EX1 in a similar way to that of FIG. 1 so that the finished cable OC is obtained at the output side.

It is possible to pull the central element CE1 through the inside of the tube RO. This central element CE1 is conducted through the bearing block LB and is taken down from a stationary or, potentially, rotating or orbiting supply drum TR, which is similar to that of FIG. 1.

Figure 7:
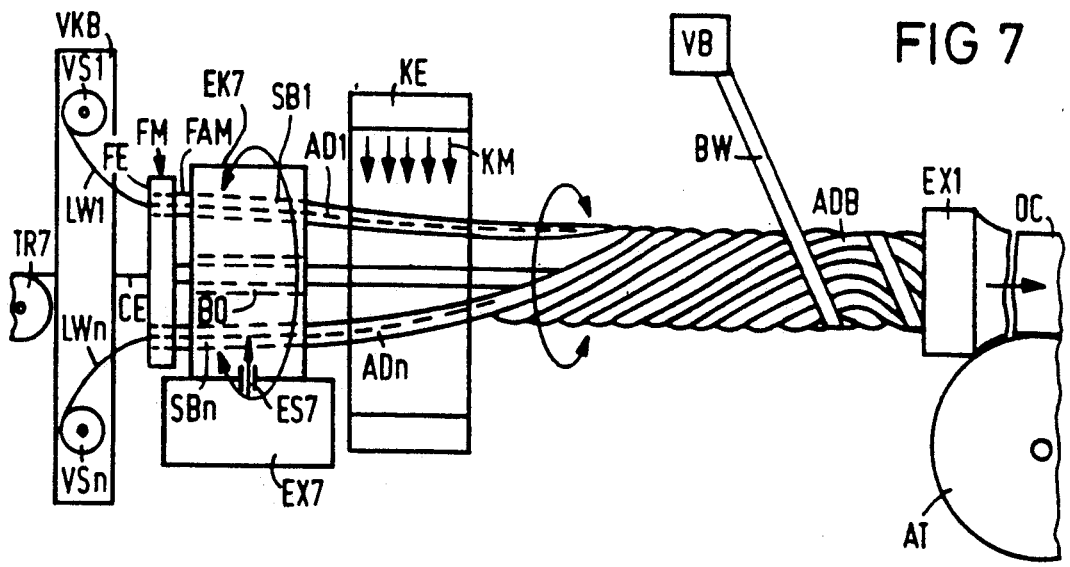
FIG. 7 is a side view of another embodiment of the apparatus for implementation of the method of the present invention.

As shown in FIG. 7, it is possible to work with supply reels VS1-VSn, which are accommodated in a rotating stranding basket VKB to provide a rotating extrusion head EK7 or, respectively, a rotating tool EK. The extrusion head or, respectively, tool EK7 is to be sealed from the outflow channel ES7 of the extruder EX7. The rotation of this extrusion head can occur in one direction to produce long lay stranding, or in a changing direction to produce SZ-stranding. No rotation or twisting around the longitudinal axis of the running direction of the overall manufacturing system need be undertaken for the central element CE. Winding onto a rotating take-up drum AT is also not required. A filling means FE is rotated together with the extruder head EK7.

The embodiment of the apparatus for performing the invention is illustrated in FIG. 8 and is an implementation of the inventive method that is represented by the arrangement of FIG. 1. Insofar as is possible, the reference characters that are, therefore, employed again here for identical parts. This apparatus can be particularly advantageously employed for SZ-stranding, for which reason the following is always based on the stranding with changing lay direction.

The haul-off drum TR is stationarily mounted in this embodiment so that the central element CE is hauledoff by a dancing roller TZ that acts as a power brake, so that the element CE is essentially guided in a stretched condition. A brake BR, which follows the dancing roller TZ, seizes the central element CE so firmly that a pull exerted from farther to the right cannot proceed via the dancing roller TZ up to the drum TR. This brake BR can be formed in a simple way by two deaccelerated disk wheels that firmly guide the central element CE therebetween. However, a fashioning as a caterpullar is also possible. The central element CE proceeds to the extruder head of the extruder EX to which the light waveguide leads LW1-LWn taken from stationary supply reels VS1-VSn are supplied. The extrusion of the lead bundle ADB and the following cooling in the cooling means KE occurs in the manner described with regard to FIG. 1, as does the application of retaining helix BW. The lead bundle ADB obtained in this manner is supplied to a twister TW that is shown here as a pair of track-like pull-off means or a caterpullar; however, it is also possible to employ a pull-off capstan or the like for this purpose.

The brake BR and the twister TW rotate synchronously with one another, with changing rotational sense or direction in order to create an SZ-stranding of the individual leads. This stranding is effected by an entrainment effect between the leads AD1-ADn produced by the extruder, on the one hand, and the central element CE, on the other hand.

Lengths of lay of the SZ-stranding that, basically, expediently lie on the order of magnitude between 50 mm and 300 mm, whereby the reversing points can be provided, for instance every 1-6 lays.

A longer torsion store for which an essentially straight line guidance of the lead bundle in a length between 2 m and 20 m is expedient and should be provided preceding the brake BR and following the twister TW. The thicker the central element CE, the longer the torsion store. For example, an additional caterpullar (not shown) or the like should be provided, as warranted, as guides in the region of this torsion store. Two stores are necessary in the SZ-twister method, whereby the first store serves for the pre-twisting of the central element, and the second sees to the backtwist of the finished core.

A separate tractorpullar or caterpullar ZR1 for the longitudinal movement of the central element or, respectively, the lead bundle, is provided at the end of the torsion store. This tractorpullar ZR1 is stationarily fashioned as not rotating. The tractorpullar ZR1 causes the pull of the central element CE or, respectively, the lead bundle through various manufacturing stages.

The cladding is applied in the following extruder EX1 so that the finished optical cable OC can be placed onto the stationary take-up drum AT.

A cable core OC, which is illustrated in FIG. 9, was formed with a filler material or layer FS provided between the central core CE and the light waveguide leads AD1-AD6. The material for this filler material can be somewhat sticky or can at least be tough in terms of viscosity and, given a rotating central element CE according to FIG. 1, can effect a good entrainment of the individual leads AD1-AD6. The filling material FS produces the longitudinal tightness between the central element CE and the individual leads, as well as between the individual leads vis-a-vis one another. In practice, it is not necessary that, as shown in FIG. 9, larger interspaces between the individual leads AD1-AD6 and the leads thereof and the central element CE be filled with filler material. The large spacing here essentially serves the purpose of better illustrating the structure.

It is basically adequate to fill the gore regions or spaces between the leads AD1-AD6 with a filler material FS when these leads tightly abut one another or nearly abut one another. To a certain extent, the filler material FS also acts as a separating agent between the individual leads.

The filler material FS can, for instance, comprise rubber-elastic properties. In this manner, the individual leads can be radially outwardly pulled, as needed, from one core union and can potentially also be re-impressed into the cable core. The filler substance FS is expediently either a solid or more loosely bonded material or a fat-like material. Given a somewhat viscous-soft format for the filler substance FS, a compact cable core, thus, in fact, occurs. However, this still allows a certain mobility for the light waveguide leads. The resistance of such an arrangement to transverse pressure is high and minimal length changes, given temperature changes, will occur. Such a cable, additionally provided with a cable cladding MA on the outside, can easily and reliably be drawn in and, above all else, is extremely assembly-friendly. As a result of the good resistance to transverse pressure, the central element CE can largely assume the required forces by itself, so that an external armoring or jacket region can be foregone in the normal case.

The filler substance FS is expediently supplied via channels in, for example, the extruder head EK, similar to the filler compound FM. For example, the nozzles SO1, SO3, SO5 of FIG. 2 can, thus, be utilized for the formation of light waveguide leads, whereas the nozzles SO2, SO4, SO6 serve the purpose of delivering the filler substance.

The filler substance FS can also be applied as an appropriately thick layer with the filler means FE. The central element CE, for example, can also be an armored mini-bundle having a plurality of light waveguide leads.

Although various minor modifications may be suggested by those versed in the art, it should be understood that we wish to embody within the scope of the patent granted hereon all such modifications as reasonably and properly come within the scope of our contribution to the art.

We claim:

1. In a method for manufacturing an optical cable containing at least two light waveguides, said method utilizing an extruder to extrude a protective sheath on the light waveguides being supplied to the extruder, the improvements comprising the extruder having a plurality of nozzles surrounding a center opening, supplying the waveguides eccentrically in separate paths to the extruder, guiding at least one of said waveguides through each nozzle, extruding an envelope at each nozzle onto the light waveguides to form a plurality of independent light waveguide leads leaving the extruder, cooling said plurality of light waveguide leads as they leave the extruder, supplying a central element through the center opening of the extruder and then stranding the leads around the central element to form a lead bundle immediately after cooling with the stranding being performed with a changing direction of rotation to form an SZ-stranding.

2. In a method according to claim 1, wherein the step of stranding utilizes a stationary extruder and includes taking the central element from a supply drum, rotating the central element along a longitudinal axis as it passes through the center opening of the extruder to be in the center of the lead bundle so that the waveguide leads are stranded due to the rotation of the central element.

3. In a method according to claim 2, wherein the step of rotating the central lead on the longitudinal axis includes rotating the supply drum for the central element around the longitudinal axis as the central element is hauled-off therefrom, and said method including rotating a take-up drum on a first axis extending perpendicular to the longitudinal axis, and orbiting the take-up drum around said longitudinal axis and then winding a finished optical cable including the lead bundle onto the rotating and orbiting take-up drum.

4. In a method according to claim 2, which includes providing a tube following the extruder, rotating said tube on the longitudinal axis of said bundle and placing the light waveguide leads received from the extruder onto the rotating tube to cause stranding thereof.

5. In a method according to claim 4, wherein the central element is conducted through the inside of said rotating tube so that the stranded leads leaving the tube are placed on said central element.

6. In a method according to claim 2, which includes seizing the central element by a brake rotating around the longitudinal axis to twist said element, said light waveguide leads being placed on the central element rotating in this fashion to be stranded thereon to form the lead bundle, seizing the lead bundle by a twister rotating around the longitudinal axis in the same direction and manner as the brake.

7. In a method according to claim 6, which includes providing a take-up drum for the optical cable being formed, and maintaining both said supply drum and take-up drum stationary in space.

8. In a method according to claim 6, which includes applying a dancing roller to the central element before seizing the element with said brake, said dancing roller acting as a power brake.

9. In a method according to claim 6, which includes providing a twister for twisting the lead bundle, freely guiding the lead bundle over a length in a range of 2 m to 20 m immediately before the brake and following the twister means, whereby the guidance is employed as a torsion store.

10. In a method according to claim 6, which includes gripping the lead bundle with a twister and then gripping it with a tractorpullar after leaving the twister, said tractorpullar controlling the force for the pull-through of the central element and the lead bundle.

11. In a method according to claim 1, wherein the step of supply a central element provides a stationary haul-off drum for the central element, taking the central element from the haul-off drum, providing a supply reel arranged in a stranding basket for each of the light waveguides, rotating said stranding basket and extruder head together as the light waveguide leads are being formed, and providing a stationary take-up drum for the lead bundle being formed.

12. In a method according to claim 1, wherein the light waveguide leads are conducted through bores in an extruder head, said bores being arranged concentrically relative to the discharge nozzles, which form the envelope on each of the light waveguides to form the waveguide leads.

13. In a method according to claim 1, which includes forming a first layer of light waveguide leads on the central element and applying a second layer on said first layer.

14. In a method according to claim 13, wherein the step of extruding the leads extrudes two layers of light waveguides on different diameters.

15. In a method according to claim 13, wherein the step of forming a first layer of light waveguide leads includes stranding the leads to form the lead bundle after a first extruder and including providing a second extruder downstream of the first extruder to form a second layer of light waveguide leads for application onto the first layer.

16. An apparatus for forming an optical cable having a layer of optical leads SZ-stranded onto a central element, said apparatus comprising an extruder having an extruder head comprising a number of through-bores distributed over a circumference around a center opening to serve the purpose of receiving and guiding light waveguides as an envelope is extruded onto each of the light waveguides to form light waveguide leads, cooling means immediately following said extruder for cooling the extruded envelopes, and means being provided following the cooling means for SZ-stranding the light waveguide leads onto the central element being introduced through the center opening.

17. An apparatus according to claim 16, which includes a haul-off for a central element being provided prior to said extruder.

18. An apparatus according to claim 16, which includes twisting means for twisting the central element on a longitudinal axis, so that light waveguide leads are pressed upon the central element and stranded due to entrainment thereon.

19. An apparatus according to claim 18, wherein the twisting means includes a haul-off drum for the central element and a take-up drum for the finished cable, said haul-off drum and take-up drum being rotated around the longitudinal axis of the central element.

20. An apparatus according to claim 18, which includes a supply drum for the central element and a take-up drum for the finished cable being arranged stationarily in space, brake means rotating around the longitudinal axis of the central element being provided before the extruder for impressing a torsion onto the central element, twister means for seizing the light waveguide bundle formed of the light waveguide leads being provided following the extruder and rotating around the longitudinal axis of the central element, said brake means and twister means being rotated synchronously and in the same direction.

21. An apparatus according to claim 20, wherein a straight guide of the lead bundle serves as a torsion store and is provided following the twister means over a length in a range of 2 m to 20 m.

22. An apparatus according to claim 20, which includes a tractorpullar being positioned following the twister means for applying a longitudinal traction on the central element and lead bundle leaving the twister means.

23. An apparatus according to claim 19, wherein the means for twisting being implemented in a stranding process and design so that the changing stranding direction of the light waveguide occurs to form the SZ-stranding.

24. An apparatus according to claim 23, which includes means for applying a helix onto a lead bundle following the extruder.

25. An apparatus according to claim 16, which includes a haul-off drum and a take-up drum being arranged stationarily in space.

26. An apparatus according to claim 16, which includes an additional extruder being provided for applying a cable cladding downstream of the first-mentioned extruder.

27. An apparatus according to claim 16, wherein the extruder head comprises a plurality of concentric rings of injection molding nozzles that serve the purpose of forming more than one layer of light waveguide leads.

28. An apparatus according to claim 16, which includes a plurality of extruders being arranged at a distance from one another, each of said extruders comprising a circular arrangement of discharge nozzles so that each of the extruders supplies at least one layer of light waveguide leads for forming the lead bundle.

29. An apparatus according to claim 16, which includes a tube store being mounted at one end by drive means for rotating the store, said tube store having an axial bore and extending through the center opening of the extruder head, and the light waveguide leads being formed by the extruder lying on a free end of the tube store and being stranded thereby.

30. An apparatus according to claim 16, wherein filling means are provided upstream of the extruder head for applying a filling compound on the waveguide, said light waveguides being guided through said filling means to receive the filling compound prior to passing through the extruder head.

31. An apparatus according to claim 16, which includes a supply drum being stationarily provided in the space for the central element, said extruder head being rotated with the light waveguide leads around the longitudinal axis of the central element, said supply reels being provided for each of the light waveguides in a rotating stranding basket rotating with said extruder head and a take-up drum for the finished cable.

* * * * *